(12) United States Patent
Mannerfelt

(10) Patent No.: US 7,813,850 B2
(45) Date of Patent: Oct. 12, 2010

(54) SYSTEM AND METHOD FOR SHOCK ABSORBER DIAGNOSTIC

(75) Inventor: Carl Mannerfelt, Göteborg (SE)

(73) Assignee: Volvo Lastvagnar AB (SE)

(*) Notice: Subject to any disclaimer, the term of this patent is extended or adjusted under 35 U.S.C. 154(b) by 1465 days.

(21) Appl. No.: 10/908,508

(22) Filed: May 15, 2005

(65) Prior Publication Data

US 2008/0039994 A1 Feb. 14, 2008

Related U.S. Application Data

(63) Continuation of application No. PCT/SE03/01516, filed on Sep. 30, 2003, now abandoned.

(30) Foreign Application Priority Data

Nov. 15, 2002 (SE) .................................. 0203382

(51) Int. Cl.
*G01C 22/00* (2006.01)
*B60G 17/005* (2006.01)
*B60K 28/14* (2006.01)

(52) U.S. Cl. .................. 701/30; 701/29; 701/37; 280/5.501; 280/5.519; 180/282; 180/197

(58) Field of Classification Search ............... 701/37, 701/38, 30, 29; 280/5.501, 5.519; 267/64.24, 267/64.16; 73/11.07; 180/282, 197
See application file for complete search history.

(56) References Cited

U.S. PATENT DOCUMENTS

| | | | | |
|---|---|---|---|---|
| 2,923,147 A | * | 2/1960 | MacMillan | 73/11.07 |
| 3,030,796 A | * | 4/1962 | MacMillan | 73/11.07 |
| 4,828,232 A | * | 5/1989 | Harrod et al. | 267/64.24 |
| 4,836,511 A | * | 6/1989 | Buma et al. | 267/64.16 |
| 4,973,855 A | * | 11/1990 | Kamimura et al. | 280/5.501 |
| RE34,628 E | * | 6/1994 | Fujishiro et al. | 280/5.519 |
| 5,377,107 A | * | 12/1994 | Shimizu et al. | 701/37 |
| 5,381,335 A | * | 1/1995 | Wolf | 701/37 |
| 5,430,647 A | * | 7/1995 | Raad et al. | 701/38 |
| 5,513,108 A | * | 4/1996 | Kishimoto et al. | 701/38 |
| 5,555,173 A | * | 9/1996 | Campbell et al. | 701/37 |
| 2001/0019268 A1 | * | 9/2001 | Pohl et al. | 324/423 |
| 2002/0096841 A1 | * | 7/2002 | Hedenberg | 280/6.159 |

FOREIGN PATENT DOCUMENTS

| | | |
|---|---|---|
| DE | 19823369 A1 | 12/1999 |
| EP | 0162818 A1 | 11/1985 |
| EP | 223653 | 5/1987 |
| EP | 0223653 A1 | 5/1987 |
| EP | 0455993 B1 | 4/1991 |
| EP | 0611960 A2 | 8/1994 |

OTHER PUBLICATIONS

TI-Active Low Pass Filter Design.*

* cited by examiner

*Primary Examiner*—Khoi Tran
*Assistant Examiner*—Ian Jen
(74) *Attorney, Agent, or Firm*—Novak Druce + Quigg LLP

(57) ABSTRACT

System and method to diagnose shock absorbers (7) on a vehicle (2) and where at least one of the vehicle's wheel axles are air suspended. A control unit (5) with at least one measuring device (4) connected thereto is provided and in which the measuring device (4) measures a signal that corresponds to the oscillations of the vehicle's wheel suspension. The control unit (5) analyzes the characteristic resonance frequency of the vehicle's wheel suspension.

23 Claims, 2 Drawing Sheets

SYSTEM AND METHOD FOR SHOCK ABSORBER DIAGNOSTIC

CROSS-REFERENCE TO RELATED APPLICATIONS

The present application is a continuation patent application of International Application No. PCT/SE2003/001516 filed 30 Sep. 2003 which was published in English pursuant to Article 21(2) of the Patent Cooperation Treaty, and which claims priority to Swedish Application No. 0203382-7 filed 15 Nov. 2002. Said applications are expressly incorporated herein by reference in their entireties.

TECHNICAL FIELD

The present invention relates to a system and a method for shock absorber diagnostics at a vehicle, where at least one of the vehicle's wheel axles is air suspended.

BACKGROUND OF THE INVENTION

Most vehicles are equipped with a wheel-suspension system consisting of a spring suspension unit and a shock absorber unit. On motor vehicles, the spring suspension unit usually consists of either a coil spring, a leaf spring or an air spring and the shock absorber unit is usually a hydraulic shock absorber. The spring suspension unit is used to reduce the stresses on the vehicle. Shock absorbers are used to damp the oscillations of the part of the vehicle that are spring suspended. A worn or defective shock absorber has an impaired ability to damp, which means that the damping of oscillations in the vehicle is impaired or ceases completely. As the damping ability of the shock absorbers affects the vehicle's driving characteristics, an impaired damping ability leads to impaired driving characteristics and, in the worst case, the vehicle becomes unsafe to drive.

When a shock absorber is worn or defective, it is to be replaced by a new shock absorber. On cars, this is usually carried out depending upon the age of the shock absorber and/or the mileage for which the shock absorber has been used. Sometimes the replacement of shock absorbers is not carried out until the driver notices that the shock absorbers are noticeably worse, for example when the car sways an abnormal amount. For cars, these methods can be acceptable, particularly for cars that are driven with light loads. For cars that are driven with heavy loads or for heavy vehicles, such as trucks, such a method is not, however, acceptable. As the ageing of a truck's shock absorbers depends to a great extent upon the load, it is not possible to use age and/or mileage as the replacement criterion. In addition, it can be the case that the shock absorbers on one axle become worn more quickly than the shock absorbers on another axle, for example the shock absorbers can become worn more quickly on a front axle than on a rear axle.

In order to optimize the servicing costs, it is desirable not to replace the shock absorbers more frequently than necessary. At the same time, it is not desirable to wait to replace the shock absorbers until the vehicle is unsafe to drive. Therefore it would be desirable to be able to detect the condition of the shock absorbers in order to be able to determine a suitable occasion for when the shock absorbers are to be replaced.

There is currently no good method for detecting the condition of shock absorbers. A common way is to drive so far with the shock absorbers that the driving characteristics of the vehicle deteriorate noticeably, due to the impaired damping characteristics of the shock absorbers. This means that, in certain cases, the vehicle can become unsafe to drive.

Another way is to guess when the shock absorbers need to be replaced, on the basis of the mileage. For some haulage vehicles it is possible to estimate the ratio between load and mileage, for example, it is a reasonable estimate for a timber truck that approximately half the mileage is driven with a full load and half without a load. In a special case such as this, it can perhaps work satisfactorily. However, for vehicles that carry mixed haulage, this is a poor method.

A third way is to dismount the shock absorbers and test them in a test rig. This is an expensive and impractical method.

EP 0455993 describes a method for analyzing the condition of either a wheel, tire or shock absorber on a car. Depending upon which component is to be analyzed, two or more sensors are used, mounted on two different wheel axles. The two wheel axles must be excited with the same road unevenness. After signal processing, where among other things the signals from the front and rear axles are analyzed and where the difference between the signals is compared with stored values, the condition of the wheel, tire or shock absorber can be determined.

This method can perhaps work in certain cases, but it has a number of disadvantages. Firstly, it is necessary to have a plurality of sensors which is expensive and also means that the signal processing is complicated. Secondly, the method requires input values from the vehicle, for example the vehicle speed, which increases the complexity. In addition, the method is not suitable for vehicles, such as trucks, where the vehicle's load varies greatly between an empty and a fully-loaded vehicle.

EP 0223653 describes a method and a device for measuring the characteristics of a spring-suspension system on a vehicle. The spring-suspension system comprises shock absorbers and coil springs. In order to detect the damping characteristics of the shock absorbers, that is, in order to see whether the shock absorbers are in good condition, a signal is measured which represents the oscillations of the spring suspension. This signal is filtered with a band-pass filter around the 12 Hz range, which is the resonance frequency of tires for cars. The amplitude of the signal is then analyzed using a permanently set analogue hardware.

This method can also work in certain cases, particularly for vehicles with coil springs. The disadvantage is that it is adapted for coil spring systems which makes the method unnecessarily complicated. In addition, the method analyzes parasitic oscillations of the tires, which make it more or less reliable, depending upon the condition of the tires and the shock absorbers. The method is also affected by variations in the weight of the vehicle and variations in the spring constant of the coil springs, for example when the coil springs age.

SUMMARY OF THE INVENTION

An object of the invention is therefore to obtain a system for shock absorber diagnostics for a vehicle with at least one air suspended wheel axle, which system is as simple, cheap and reliable as possible and also contains as few components as possible, and a method for shock absorber diagnostics for a vehicle with at least one air suspended wheel axle, which method is as simple, cheap and reliable as possible.

In at least one embodiment, the invention takes the form of a system for diagnosing shock absorbers of a vehicle where at least one of the vehicle's wheel axles is air suspended. The system comprises (includes, but is not necessarily limited to) a control unit and at least one measuring device connected to the control unit, where the measuring device measures a signal that corresponds to the oscillations of the vehicle's wheel suspension, the solution to the problem according to the invention is achieved by the control unit analyzing the characteristic resonance frequency of the vehicle's wheel suspension.

The method according to the invention solves the problem by means of the steps of measuring a signal that corresponds to the oscillations of the vehicle's wheel suspension using a sensor, of signal processing the signal measured by the sensor using a calculation unit, and of generating at least one message when the signal-processed signal exceeds or is less than at least one first predefined value.

By means of this first embodiment of the system according to the invention, diagnostics of the condition of the shock absorbers on an air suspended wheel axle can be carried out. The advantage of this system is that it is possible to detect when the damping capacity of a shock absorber has deteriorated so much that the shock absorber needs to be replaced, using only one signal that corresponds to the oscillations of the vehicle's wheel suspension. This signal can, for example, be the chassis height of the vehicle, a signal which is already available on vehicles with electronically controlled air suspension.

In an advantageous first further development of the system according to the invention, the measured signal is passed through a low-pass filter, so that only the oscillations that correspond to the characteristic resonance frequency of the vehicle's wheel suspension are retained. The advantage of this is that interference and parasitic oscillations in, for example, the tires, are filtered out, so that a more reliable analysis of the damping capacity of the shock absorbers can be carried out.

In an advantageous second development of the system according to the invention, the system is integrated with an existing electronic air-suspension system. The advantage of this is that no extra components are required.

In an advantageous third development of the system according to the invention, a message is generated when the measured signal exceeds or is less than at least one first predefined value. The aim of this is to give the driver information about the fact that the shock absorbers need to be replaced.

A method according to the invention, for carrying out shock absorber diagnostics for a vehicle with at least one air suspended wheel axle, comprises the steps:
of measuring a signal that corresponds to the oscillations of the vehicle's wheel suspension using a sensor,
of signal processing the signal measured by the sensor using a calculation unit,
of generating at least one message when the signal-processed signal exceeds or is less than at least one first predefined value.

The advantage of this method is that it is possible to carry out diagnostics of the damping capacity of a shock absorber on a vehicle in a simple and reliable way.

In an advantageous first development of the method according to the invention, the oscillations of the signal measured by the sensor in the range above 3 Hz are filtered out by means of a low-pass filter.

In an advantageous second development of the method according to the invention, the generated message is saved in a memory unit. The advantage of this is that the message can be analyzed later by an external unit.

In an advantageous third development of the method according to the invention, the generated low message is displayed as an error message using a display unit. The advantage of this is that the driver can obtain information that the shock absorbers need to be replaced.

In an advantageous fourth development of the method according to the invention, an error message is generated when a second predefined event occurs. The advantage of this is that the driver can obtain information that the shock absorbers need to be replaced.

In an advantageous fifth development of the method according to the invention, the step is included of estimating the remaining life of the shock absorber by means of the mileage and/or operating time. The advantage of this is that the shock absorbers' remaining life can be estimated at the time of a service.

BRIEF DESCRIPTION OF DRAWINGS

The invention will be described in greater detail in the following, with reference to the embodiments that are shown in the attached drawings, in which.

DETAILED DESCRIPTION

Figure 1:
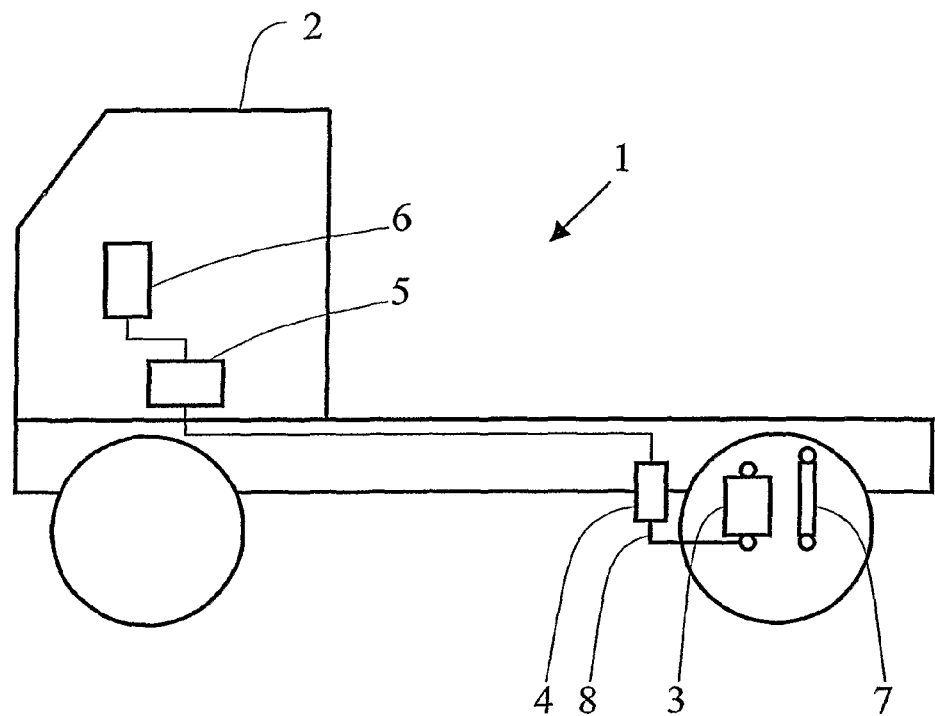
FIG. 1 shows an advantageous embodiment of a diagnostic system according to the invention.

The embodiments of the invention and further developments described in the following are only to be regarded as examples and are in no way to limit the scope of the protection provided by the claims. In the embodiments described here, the same reference numerals in the different figures refer to the same type of component. Each component is therefore not described in detail in all the embodiments.

FIG. 1 schematically shows a first embodiment of a system I configured according to the invention. In this embodiment, the system I is integrated with the electronic air-suspension system (ECS=Electronic Controlled Suspension) on a truck 2. The ECS system consists of a sensor 4, an electronic control unit 5 (ECU=Electronic Control Unit), a number of air bellows 3 and valves (not shown) which regulate the flow of air to and from the air bellows. The ECU unit 5 sends control signals to the valves in order to regulate the height of the vehicle. In addition, the ECU unit 5 is connected to the vehicle's other control units (not shown) via a data bus.

The sensor 4 is used to measure the height of the chassis of the vehicle, here referred to as the chassis height. The instantaneous chassis height is obtained by means of the sensor measuring a deviation in the form of a height change from a predefined initial position at a given time, and this deviation being added to or subtracted from a predefined height value. A height change is obtained by measuring the change in the distance between the chassis of the vehicle and one of the vehicle's rear wheel axles. A common type of sensor is a potentiometer which is attached to the vehicle's chassis and measures the change in the distance between the chassis and the wheel axle by means of a hinged arm 8 which is attached to the wheel axle. The output signal of the potentiometer is converted into a height value in the ECU unit. If the ratio between resistance and height is linear, the conversion can be carried out by analogue means, but if the ratio is non-linear, a table or a conversion function, for example, can be used.

For the purposes of the calculation, the chassis height can be represented either by a value that corresponds to an absolute value for the chassis height or by a value that is a deviation from a predefined initial position. In the example shown, the sensor measures a deviation in the form of a change in height. Depending upon the type of sensor and how the ECU unit is designed, an absolute or a relative value can be advantageous.

It is, of course, possible to use other types of sensors to measure the distance between the chassis and the wheel axle, such as an optical sensor, a magnetic sensor or an ultrasound sensor. The height of the chassis could be measured in other ways. For example, the distance between the chassis and the ground could be measured and used as a height value.

It is also possible to obtain a signal that corresponds to a variation in the vehicle's height in another way. For example, an acceleration sensor can be used to measure the acceleration of the vehicle in a vertical direction. This value corresponds to a change in the height of the vehicle. Another signal that can be used is to measure the change in pressure in one of the air bellows. Such a change in pressure gives a measure of the movement of the vehicle in a vertical direction.

As the sensor 4 in this example is a potentiometer, it provides a continuous analogue output signal. Other types of sensor can also give an analogue output signal. Sensors that give a sampled signal are also suitable for use; it is only a matter of ensuring that the sampling frequency is sufficiently high so that the measured value that is of interest can be obtained without distortions. As the variations in the height of the vehicle are relatively slow, a relatively low sampling frequency is sufficient.

The ECU unit 5 monitors and controls the air suspension. In an ordinary air-suspension system, the height of the vehicle can be adjusted when the vehicle is stationary, by the ECU unit receiving information from a height sensor relating to the height of the chassis. This height value is compared with a nominal value that can be set. If the height value differs from the nominal value, then the ECU unit controls the valves so that they either let air into the air bellows or let air out of the air bellows, depending upon the deviation, so that the set height is obtained. This function is also used when the vehicle is being loaded. When the vehicle becomes heavier, the system compensates the vehicle's height automatically so that the height of the vehicle is maintained throughout the whole of the loading process.

When the vehicle is driven, for example, on a road, the automatic compensation of the height of the vehicle is deactivated. This is carried out in order that the system will not make incorrect height adjustments when the vehicle is sprung, for example on an uneven road.

In the embodiment described, the complete vehicle 2 is air suspended; that is, both the rear axle and the front axle are air suspended. This means that diagnostics can be carried out of the condition of the shock absorbers 7 on both the front axle and the rear axle. Diagnostics can be carried out for the shock absorbers on each axle at the same time; that is, diagnostics of the combined damping capacity of the shock absorbers can be carried out by the system. The vehicle has a sensor on each axle, which also allows for diagnostics for each axle separately.

The parameters that normally determine the resonance frequency of a vehicle's wheel suspension include the spring constant of the springs and the mass of the vehicle. For a vehicle that is air suspended, the spring constant is a function of the vehicle's mass. When the change in an air spring is small during the springing, that is when the springing movement of the air spring is small in relation to the total length of the spring, the effect of the mass of the vehicle on the resonance frequency of the spring system can be neglected, so that the wheel suspension's resonance frequency is on the whole constant and accordingly independent of the vehicle's mass.

A good approximation is obtained when the air spring's springing movement is less than approximately 10% of the total length of the spring, which is the case for a normal vehicle with air suspension. This ratio applies not only for vehicles, but for all systems that have air suspension.

By means of this approximation, it follows that the resonance frequency of a vehicle with air suspension is independent of the mass of the vehicle. This means in turn that the vehicle does not need to be equipped with a load sensor for measuring the vehicle's load. No other type of input signal is required for the system to be able to estimate the vehicle's load or information such as speed and the like.

During the springing, that is from the time that the wheel suspension is set in oscillation, for example when the vehicle drives over unevenness in the road, until the oscillation is completely dampened, the resonance frequency will therefore be constant, while the amplitude of the oscillation will decrease. The size of the decrease in the oscillation; that is, the speed at which the oscillation is dampened, for example how many oscillations are required to dampen the oscillation, provides a measure of the damping capacity of the shock absorbers.

What differs between different types of vehicle is the resonance frequency of the wheel suspension; that is, the characteristic frequency at which the wheel suspension oscillates when it is excited. The term "wheel suspension" here includes the unsprung part of the vehicle, for example tires, rims, axles, etc. that is the resonance frequency of the wheel suspension is the resonance frequency of the unsprung mass. This resonance frequency is known for each type of vehicle. The resonance frequency can either be measured, for example in a test rig, or can be calculated, for example in a simulation program. The resonance frequency of the wheel suspension for a vehicle is stored in the vehicle's ECU unit. A typical resonance frequency of a vehicle with air suspension can be in the range around 1.5 Hz. It can therefore be appropriate to send the signal from the sensor through a low-pass filter in order to avoid noise and interference, either with an analogue filter placed in the sensor or at the input to the ECU unit or with a digital filter in the ECU unit. The filter should have a cut out frequency in the range below 5 Hz depending upon the slope of the filter, so that interferences, for example from the tires' parasitic oscillations that lie in the range above 10 Hz, can be filtered out.

The system according to the invention can therefore be used on all types of vehicles with air suspension, irrespective of the vehicle's construction or load. On a vehicle with an electronic air-suspension system, it is very easy to implement the system, as the electronic air-suspension system comprises a height sensor. No additional external components are therefore required, only an extra function in the software.

In the system according to the invention, the ECU unit signal processes the measured chassis-height signal that corresponds to variations in the height of the vehicle. The signal processing is carried out continuously by the ECU unit. The signal is advantageously processed in the time plane. The signal is analyzed so that a time-dependent amplitude value is obtained. This amplitude value is compared with a threshold value that consists of a predefined time and amplitude value which is stored in a memory unit in the ECU unit. The threshold value is a value that indicates the maximum permitted difference between the instantaneous amplitude value and a predefined amplitude value at a particular point in time. For example, the instantaneous amplitude value can be compared with a predefined amplitude value after three oscillations. If the threshold value is exceeded, this means that the shock absorber needs to be replaced. When the threshold value is exceeded, an error signal is generated. The error signal can be saved in a memory unit in the ECU unit together with, for example, time information about when the event occurred. At the same time, the ECU unit generates an error message that can be displayed, for example, as a text message in a display in the instrument cluster on the vehicle or by a lamp.

In another example, the maximum amplitude value of the chassis-height signal over an interval of time is analyzed. The maximum value over a period of time, for example every 0.7 seconds for a vehicle with 1.5 Hz resonance frequency, is compared with the maximum amplitude value for the following period of time. As the amplitude decreases in a known way for a correctly-operating shock absorber, the damping can be estimated by comparing the maximum amplitude values for each period of time. This provides a value for the damping capacity of the shock absorber. If the damping capacity deviates from a predefined damping capacity, the system can generate an error signal.

Alternatively, a gradient of the decrease in the amplitude value can be calculated. This gradient can be compared with a predefined permitted gradient. Sections of the gradient can also be used to evaluate whether a shock absorber's damping capacity is approved or not. For example, the gradient after a particular interval of time can be used to evaluate the damping characteristics. In this way, the behavior of the shock absorbers for small movements can be used as a sampling criterion.

It is also possible to derive the gradient of the decrease in the amplitude in order to make an evaluation of the damping capacity of the shock absorbers. For example, the time of a change of sign of the derived signal can be used as a sampling criterion.

The chassis-height signal can also be transformed into a frequency plane in a way that is well known to a person skilled in the art, in order to be analyzed. Also in the frequency plane, it is the deviation from a predefined amplitude that determines the condition of the shock absorber.

In one embodiment, the varying vehicle-height signal can be compared with a signal that indicates the acceleration of the vehicle in a vertical direction. This can be advantageous when the vehicle is being driven on a road that is occasionally uneven, where the oscillations of the vehicle would otherwise give the system an incorrect picture of the damping capacity of the shock absorbers.

When the damping capacity of a shock absorber decreases very slowly, which is the case with normal wear and tear, it can be difficult to set an exact point at which the shock absorber should be replaced. Therefore, it can be advantageous also to process the error signal in some way.

In a first development of the system according to the invention, the error signal can, for example, be weighted by other parameters of the vehicle. Mileage, operating time, the ratio between mileage and load, or the total change in the chassis height can be suitable parameters with which to weight the error signal. Such weighting can increase the precision for when a shock absorber replacement should be carried out. For example, the error signal can be filtered so that an error message is not given until the threshold value has been exceeded a predetermined number of times or a predetermined number of times per unit of time. It can be advantageous to reset the counter each time the vehicle is started. The advantage of resetting the counter is that small deviations are not compounded, but that an error message is not generated until the shock absorber requires replacement. For certain types of driving, for example for a delivery vehicle, it can be advantageous to reset the counter after a particular unit of time. This is also advantageous when the vehicle is driven on very uneven roads, where otherwise the unevenness of the road could give an incorrect picture of the damping capacity of the shock absorbers.

In a second further development of the system according to the invention, the deviation from the threshold value or the suppression value is analyzed continuously. In this way, the system can also detect small changes in a shock absorber's characteristics. In addition, incorrect error messages can be avoided which are caused by, for example, temperature variations in the shock absorber, as the function of the shock absorber is affected by, among other things, the external temperature and internal heating. A continuous analysis of the signal is also advantageous as far as servicing is concerned as the remaining life of the shock absorbers can be estimated at the time of a service. In this case, the system can, for example, estimate how much more mileage remains before the shock absorbers need to be replaced. If this calculated mileage is significantly shorter than the mileage to the next service, the shock absorbers can be replaced straight away.

For vehicles with several rear axles, the system can be designed in various ways. For example, for a truck with two rear axles mounted on a bogie, one of which can be raised, then the system can, if the vehicle is equipped with a height sensor for the bogie, carry out a diagnostic for all the shock absorbers when both the axles are in contact with the road. When one axle is raised up, then a diagnostic can be carried out for the shock absorbers on the axle that is in contact with the road. As the damping capacity for all the shock absorbers and the damping capacity for the shock absorbers on one axle are known, the damping capacity for the shock absorbers on the other axle can be calculated. In a similar way, the system can be designed for vehicles with three rear axles.

Figure 2:
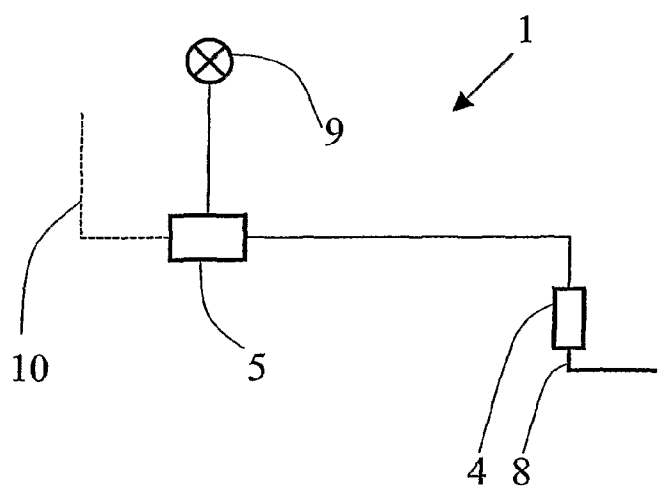
FIG. 2 shows an advantageous further development of a diagnostic system according to the invention.

In a second embodiment of the system according to the invention, shown in FIG. 2, the system according to the invention is designed as a separate detection system intended to be retrofitted on a vehicle with air suspension. The system comprises at least one sensor 4, for example in the form of a height sensor, and an electronic signal-processing unit 5 (ECU). A warning device 9 can be connected to the ECU unit 5 for error messages, for example a lamp or a buzzer that warns when the shock absorbers need to be replaced. It is also possible to modify the ECU unit's interface so that this can send error messages to the vehicle's existing instruments via an existing data bus 10. In the cases where the system is retrofitted and the vehicle already has a height sensor, it is of course also possible to modify the system so that the existing sensor can be used as a sensor for the system. The ECU unit processes the measured height signal in the same way as described above. The function of the system is also the same as described above and is therefore not described in greater detail. The ECU unit advantageously comprises a processor, but a completely analogue ECU unit is also possible.

Figure 3:
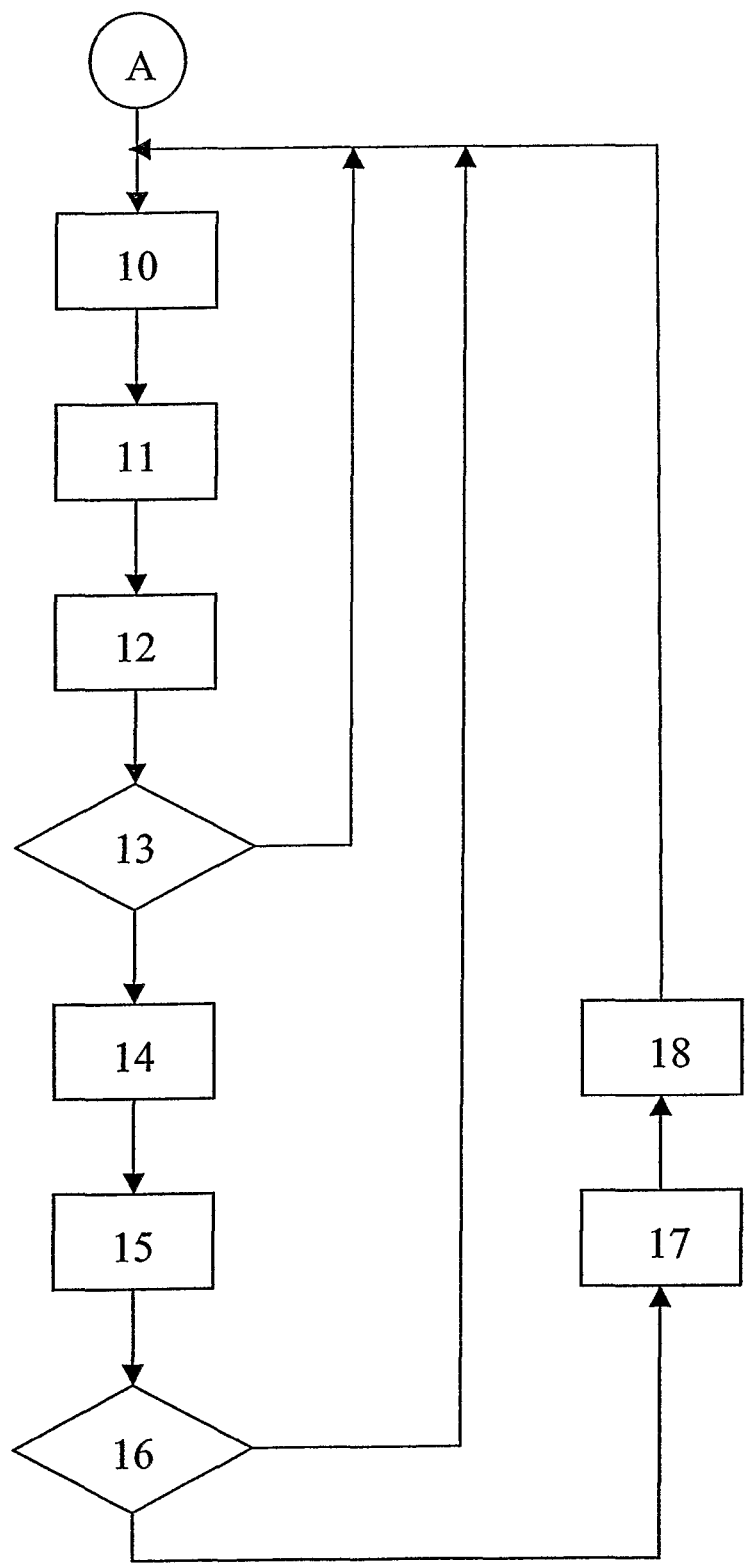
FIG. 3 shows a flow chart of a diagnostic method according to the invention.

In a first embodiment of the method according to the invention, diagnostics are carried out of the damping capacity of the shock absorbers on a vehicle with at least one air suspended wheel axle. This is carried out in order to be able to detect when the damping capacity of the shock absorbers is reduced so much that they need to be replaced. FIG. 3 shows a flow chart of the method according to the invention.

In this embodiment, the system is integrated with the electronic air-suspension system (ECS) on a truck. The ECS system comprises among other things a height sensor and an electronic control unit (ECU).

Initiation of the measuring system is carried out, for example, in conjunction with the vehicle being started. The height sensor measures the height of the chassis in Step 10. As the resonance frequency of the wheel suspension of the vehicle lies typically in the range 1-2 Hz, it can be advantageous to send the signal from the height sensor through a low-pass filter, either with an analogue filter placed in the sensor or at the input of the ECU unit or with a digital filter in the ECU unit. The low-pass filtering is carried out in Step 11.

The ECU unit signal processes the measured chassis height signal in Step 12. The signal is processed in a way known to the person skilled in the art, for example in the time plane. The signal is analyzed so that a suitable measured value is obtained for evaluating the damping characteristics of the shock absorbers, for example by means of a time-dependent amplitude value.

Steps 10, 11 and 12 are only described here schematically. A typical measurement signal can, for example, be the resonance signal from the moment when the wheel suspension is excited until the oscillation has ceased. Therefore Steps 10 to 12 correspond to measuring and signal processing of a complete sequence of oscillations. The wheel suspension is typically excited by a well-defined unevenness in the road and is thereafter dampened. In the method described herein, such a sequence corresponds to Steps 10 to 12.

The amplitude value obtained is compared with a threshold value, for example consisting of a predefined time-dependent amplitude value in Step 13. The threshold value is a value that indicates the maximum permitted deviation from a predefined time-dependent amplitude value. The threshold value is stored in a memory unit in the ECU unit.

If the amplitude value does not exceed the threshold value in Step 13, then the system continues by measuring the chassis height in Step 10. If the amplitude value exceeds the threshold value in Step 13, then one or more values are stored in a memory unit in Step 14, for example the amplitude value, the time of the event and/or mileage.

In Step 15, a counter is incremented. This counter indicates how many times the time-dependent amplitude value has not been approved. This is carried out in order to avoid unnecessary error messages. In Step 16, the counter is compared with a predefined limit value. This limit value indicates when an error message is to be generated. If the counter value is not larger than the limit value, then the system continues by measuring the chassis height in Step 10. If the counter value is larger than the limit value, then an error message is generated in Step 17. The error message can, for example, be displayed as a text message on a display in the vehicle's instruments. The error message is also stored in a memory unit in Step 18. Thereafter, the system continues by measuring the chassis height in Step 10.

The signal can, of course, also be analyzed in the frequency plane if so desired.

As the damping capacity of a shock absorber decreases slowly, it can be difficult to determine exactly a maximum limit value for the time-dependent amplitude. Therefore it can be advantageous to weight in more parameters when the time for changing the shock absorbers is to be determined.

In a first development of the method according to the invention, the step is included of counting how many times a predefined threshold value has been exceeded. For example, the time for changing the shock absorbers can be considered to have been reached when the predefined threshold value has been exceeded 100 times.

In a second development of the method according to the invention, the step is included of counting how many times the threshold value has been exceeded per unit of time. For example, the time for changing the shock absorbers can be considered to have been reached when the threshold value has been exceeded 10 times/hour.

In order to ensure that a vehicle does not become unsafe to drive, it is advantageous to define the stored threshold value in such a way that there is a margin for safety. For example, the stored threshold value can be selected in such a way that the vehicle can be driven for at least 5000 km when an error message is generated.

Other parameters that can be used to weight the characteristic value are, for example, mileage, operating time, the ratio between mileage and load or the total change in chassis height. Which parameters are used and how they are used is determined, among other things, taking into account the type of vehicle and experience.

In a third development of the method according to the invention, the deviation from the threshold value or the suppression value is analyzed continuously. In this way, small changes in the shock absorber characteristics can also be detected. This is particularly advantageous as far as servicing is concerned as the remaining life of the shock absorbers can be estimated at the time of a service. In this case, the system can, for example, estimate how much more mileage remains before the shock absorbers need to be replaced. If this calculated mileage is significantly shorter than the mileage to the next planned service, the shock absorbers can be replaced straight away.

A computer program according to the invention comprises program code that carries out a shock absorber diagnostic for a vehicle with at least one air suspended axle, when the program is executed by a processor integrated with a control unit.

The computer program according to the invention can be stored on a medium that can be read by a computer system integrated with the control unit. This medium can, for example, be a data disk, a memory module, a CD or the like. This can be advantageous, for example, when the program is to be down-loaded into the vehicle during production and/or when the program in the vehicle is to be updated. The updating of software can be carried out, for example, during fixed services or, if so desired, directly by a customer. The updating of software can also be carried out via a link-up, for example via the Internet, to a server where the program is stored.

The invention is not to be regarded as being limited to the embodiments described above, a number of additional variants and modifications being possible within the framework of the following patent claims. The system and the method can, for example, also be used for vehicles that run on rails and also in fixed installations where a mechanical component has air suspension and is dampened by a hydraulic shock absorber.

What is claimed is:

1. A system to diagnose shock absorbers (7) on a vehicle (2) with at least one air suspended wheel axle, said system comprising:
    a control unit (5) and at least one measuring device (4) connected to the control unit (5) and wherein said measuring device (4) generates a signal that corresponds to oscillations of the vehicle's air suspended wheel axle when the vehicle is driven on a road, and wherein the control unit (5) analyzes the signal in order to determine whether the damping properties of the shock absorbers have deteriorated based on the oscillations of the vehicle's air suspended wheel axle;
    the system further comprising a low-pass filter that filters out oscillations in the signal in the range above 3 Hz.

2. The system as claimed in claim 1, wherein said measuring device (4) measures the vehicle's chassis height.

3. The system as recited in claim 1, wherein the measuring device (4) is mounted on the vehicle's chassis and is movably connected to said air suspended wheel axle.

4. The system as recited in claim 1, wherein the measuring device (4) is a potentiometer or a pulse transducer.

5. The system as recited in claim 1, wherein the control unit (5) is configured to process the signal in the time plane.

6. The system as recited in claim 1, wherein the control unit (5) is configured to process the signal in the frequency plane.

7. The system as recited in claim 1, wherein the system (1) is integrated with an existing electronic air-suspension system on the vehicle (2).

8. The system as recited in claim 1, wherein the system (1) generates at least one message when the measured signal exceeds at least one first predefined value.

9. The system as recited in claim 1, wherein the system (1) generates at least one message when the measured signal is less than at least one first predefined value.

10. A method for a diagnosing shock absorbers on a vehicle with at least one air suspended wheel axle, the method comprising:
    using a sensor, generating a signal that corresponds to oscillations of the vehicle's wheel suspension when the vehicle is driven on a road;
    processing the signal using a calculation unit in order to determine whether the damping properties of the shock absorbers have deteriorated based on the oscillations of the vehicle's wheel suspension; and
    generating at least one message when the signal-processed signal exceeds at least one first predefined value;
    wherein the method further comprises filtering out oscillations in the range above 3 Hz in the signal by means of a low-pass filter.

11. The method as recited in claim 10, wherein the signal is signal processed in the frequency plane.

12. The method as recited in claim 10, wherein the signal is signal processed in the time plane.

13. The method as recited in claim 10, wherein the method further comprises generating an error message when a second predefined event occurs.

14. The method as recited in claim 10, wherein the method further comprises estimating the remaining life of the shock absorbers by means of the vehicle's mileage and/or operating time.

15. A method for diagnosing shock absorbers on a vehicle with at least one air suspended wheel axle, the method comprising:
    using a sensor, generating a signal that corresponds to oscillations of the vehicle's wheel suspension when the vehicle is driven on a road;
    processing the signal using a calculation unit in order to determine whether the damping properties of the shock absorbers have deteriorated based on the oscillations of the vehicle's wheel suspension; and
    generating at least one message when the signal-processed signal is less than at least one first predefined value;
    wherein the method further comprises filtering out oscillations in the range above 3 Hz in the signal by means of a low-pass filter.

16. The method as recited in claim 15, wherein the signal is signal processed in the frequency plane.

17. The method as recited in claim 15, wherein the signal is signal processed in the time plane.

18. The method as recited in claim 15, wherein the method further comprises generating an error message when a second predefined event occurs.

19. The method as recited in claim 15, wherein the method further comprises estimating the remaining life of the shock absorbers by means of the vehicle's mileage and/or operating time.

20. A computer program comprising program code for carrying out executable steps when said program is executed by a computer for diagnosing shock absorbers on a vehicle with at least one air suspended wheel axle, said executable steps comprising:
    processing a signal generated by a sensor on the vehicle and corresponding to oscillations of the vehicle's wheel suspension in order to determine whether the damping properties of the shock absorbers have deteriorated based on the oscillations of the vehicle's wheel suspension; and
    generating at least one message when the signal-processed signal exceeds at least one first predefined value.

21. A computer program product comprising program code stored on a medium that can be read by a computer for carrying out executable steps when said program is executed by a computer for diagnosing shock absorbers on a vehicle with at least one air suspended wheel axle, said executable steps comprising:
    processing a signal generated by a sensor on the vehicle and corresponding to oscillations of the vehicle's wheel suspension in order to determine whether the damping properties of the shock absorbers have deteriorated based on the oscillations of the vehicle's wheel suspension; and
    generating at least one message when the signal-processed signal exceeds at least one first predefined value.

22. A computer program comprising program code for carrying out executable steps when said program is executed by a computer for diagnosing shock absorbers on a vehicle with at least one air suspended wheel axle, said executable steps comprising:
    processing a signal generated by a sensor on the vehicle and corresponding to oscillations of the vehicle's wheel suspension in order to determine whether the damping properties of the shock absorbers have deteriorated based on the oscillations of the vehicle's wheel suspension; and
    generating at least one message when the signal-processed signal is less than at least one first predefined value.

23. A computer program product comprising program code stored on a medium that can be read by a computer for carrying out executable steps when said program is executed by a computer for diagnosing shock absorbers on a vehicle with at least one air suspended wheel axle, said executable steps comprising:
    processing a signal generated by a sensor on the vehicle and corresponding to oscillations of the vehicle's wheel suspension in order to determine whether the damping properties of the shock absorbers have deteriorated based on the oscillations of the vehicle's wheel suspension; and
    generating at least one message when the signal-processed signal is less than at least one first predefined value.

* * * * *